United States Patent
Yoo et al.

(10) Patent No.: US 7,146,416 B1
(45) Date of Patent: Dec. 5, 2006

(54) WEB SITE ACTIVITY MONITORING SYSTEM WITH TRACKING BY CATEGORIES AND TERMS

(75) Inventors: Janet Yoo, San Francisco, CA (US); Kian-Tat Lim, Palo Alto, CA (US); Stanley Ben Wong, San Jose, CA (US); Elliott Yasnokvsky, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 561 days.

(21) Appl. No.: 09/654,405

(22) Filed: Sep. 1, 2000

(51) Int. Cl.
*G06F 15/16* (2006.01)
(52) U.S. Cl. ...................... 709/224; 709/207
(58) Field of Classification Search .............. 707/2, 707/3, 5, 10, 6; 709/223, 224, 201, 202, 709/203, 204, 206, 207, 225, 229; 705/10
See application file for complete search history.

(56) References Cited

U.S. PATENT DOCUMENTS

| | | | |
|---|---|---|---|
| 6,230,204 B1 * | 5/2001 | Fleming, III | 709/229 |
| 6,233,618 B1 * | 5/2001 | Shannon | 709/229 |
| 6,338,066 B1 * | 1/2002 | Martin et al. | 707/10 |
| 6,418,433 B1 * | 7/2002 | Chakrabarti et al. | 707/5 |
| 6,470,383 B1 * | 10/2002 | Leshem et al. | 709/223 |
| 6,519,585 B1 * | 2/2003 | Kohli | 707/3 |
| 6,640,218 B1 * | 10/2003 | Golding et al. | 707/2 |
| 6,647,383 B1 * | 11/2003 | August et al. | 707/3 |
| 6,826,559 B1 * | 11/2004 | Ponte | 707/3 |
| 6,839,680 B1 * | 1/2005 | Liu et al. | 705/10 |

\* cited by examiner

*Primary Examiner*—Paul H. Kang
(74) *Attorney, Agent, or Firm*—Morrison & Foerster LLP

(57) ABSTRACT

A traffic monitor provides statistics of traffic using an activity input for receiving data related to activity on a server system. Events being monitored are binned by topic or term, where the terms are associated with categories. The categories can be a hierarchy of categories and subcategories, with terms being in one or more categories. The categorized events include page views and search requests and the results might be normalized over a field of events and a result output for outputting results of the normalizer as the statistical analyses of traffic.

47 Claims, 15 Drawing Sheets

|   | Day 1 | Day 2 | ... | Day K |
|---|---|---|---|---|
| 150 — | Category 1<br>Category 2 | Category 1<br>Category 2 |  | Category 1<br>Category 2 |
| 152 — | ⋮ | ⋮ | ... | ⋮ |
|  | Category N | Category N |  |  |
| 154 — | Term 1<br>Term 2 | Term 1<br>Term 2 |  |  |
|  | ⋮ | ⋮ |  |  |
|  | Term M | Term M |  |  |

(170 labels the table)

FIG. 4

| Welcome, user123yahoo! | | | | Preferences - My Buzz Index | |
|---|---|---|---|---|---|
| Yahoo! Buzz Index | | | | | |
| Buzz Index | What's the Buzz? | | | August 12, 2000 | |
| Vertical Market Categories | Overall Buzz - Ranked by Change - Daily | | | | |
| [Search] | Rank | Term | Buzz | Change ▼ | Related Links |
| | 1. | formula one grand prix | 15.12 | +1603.10% | News, Categories, Sites |
| [Search] | 2. | northern lights | 4.73 | +421.31% | News, Categories, Sites |
| | 3. | Charlie Chaplin | 5.51 | +287.98% | News, Categories, Sites |
| | Show Overall Buzz details | | | | |
| | Movie Buzz - Ranked by Change - Daily | | | | |
| | Rank | Term | Buzz | Change ▼ | Related Links |
| | 1. | Charlie Chaplin | 5.05 | +318.55% | News, Categories, Sites |
| | 2. | The Yahoo! Story | 3.22 | +115.89% | News, Categories, Sites |
| | 3. | spiderman | 1.59 | +111.56% | News, Categories, Sites |
| | Show Movie Buzz details | | | | |
| | Music Buzz - Ranked by Change - Daily | | | | |
| | Rank | Term | Buzz | Change ▼ | Related Links |
| | 1. | Artist X | 2.68 | +197.23% | News, Categories, Sites |
| | 2. | Artist D | 2.85 | +140.13% | News, Categories, Sites |
| | 3. | The Big Band | 2.47 | +115.20% | News, Categories, Sites |
| | 4. | Popular Teens | 12.33 | +97.04% | News, Categories, Sites |
| | 5. | The Blues Players | 2.92 | +75.49% | News, Categories, Sites |
| | Show Music Buzz details | | | | |
| | Sports Buzz - Ranked by Change - Daily | | | | |
| | Rank | Term | Buzz | Change ▼ | Related Links |
| | 1. | boxing | 12.25 | +98.09% | News, Categories, Sites |
| | 2. | alpine valley | 1.53 | +87.74% | News, Categories, Sites |
| | 3. | formula 1 | 19.00 | +71.10% | News, Categories, Sites |
| | Show Sports Buzz details | | | | |

FIG. 9

YAHOO! Buzz Index

Yahoo! - Sign Out - Help

Welcome, ybuzz!     Preferences - My Buzz Index

Yahoo! Buzz Index
Buzz Home

Home > Buzz

Search

[ Search ]

Vertical Market Categories

- apparel
- arts and humanities
- autos
- aviation and aeronautics
- books
- career employment
- computers
- construction
- education

- electronics
- entertainment
- environment and nature
- finance
- fitness and nutrition
- food and beverages
- games
- government and politics
- health

- hobbies
- home
- military
- news
- online community
- parenting and children
- personal care
- pets and animals
- real estate

- religion and spirituality
- science
- sports
- telecommunications
- toys
- travel and transportation

Top Buzz Words across all categories

Average over [ just this day: ▼ ] [ August ▼ ] [ 12 ▼ ] [ 2000 ▼ ] [ Change ]

| August 12, 2000 [ Daily View - Weekly View ] | | | |
|---|---|---|---|
| Rank | Term | Buzz | Change ▼ | Related Links |
| 1. | formula one grand prix | 15.12 | +1603.10% | News, Categories, Sites |
| 2. | northern lights | 4.73 | +421.31% | News, Categories, Sites |
| 3. | bridgette wilson | 5.51 | +287.98% | News, Categories, Sites |
| 4. | california super lotto | 3.76 | +273.14% | News, Categories, Sites |
| 5. | super lotto | 6.48 | +240.41% | News, Categories, Sites |
| 6. | california lotto | 10.10 | +219.27% | News, Categories, Sites |
| 7. | first union center | 3.45 | +192.61% | News, Categories, Sites |
| 8. | california lottery | 25.07 | +188.78% | News, Categories, Sites |
| 9. | young | 8.27 | +181.25% | News, Categories, Sites |
| 10. | noah bastian | 2.87 | +169.51% | News, Categories, Sites |
| Next... | | Show 100 Terms | Download Top 500 | |

FIG. 10

YAHOO! Buzz Index

Yahoo! - Sign Out - Help

Welcome, ybuzz!     Preferences - My Buzz Index

Yahoo! Buzz Index     Buzz Home

Home > Buzz > entertainment > music

Search

[Search] ○ across all categories ⊙ in this category music     [ Add Category to My Buzz Index ]

- alternative and indie
- blues
- cajun and zydeco
- christian and gospel
- classical and instrumental
- country
- electronic
- entertainment/music/latin
- experimental
- folk
- hardcore punk ska
- industrial and gothic
- instruments and education
- international
- jazz
- kids and family
- metal and hard rock
- new age
- r and b and soul
- rap and hip hop
- reggae
- rock and pop
- soundtracks
- vocal and theatrical

Top Buzz Subcategories for *music*

Average over [just this day:] [August] [12] [2000] [Change]

| August 12, 2000 [ Daily View - Weekly View ] |||
|---|---|---|
| Rank Subcategory | Buzz | Change |
| 1. kids and family | 0.77 | +55.25% |
| 2. soundtracks | 2.53 | +27.34% |
| 3. new age | 0.79 | +27.12% |
| 4. experimental | 0.26 | +23.23% |
| 5. international | 19.50 | +22.58% |
| 6. metal and hard rock | 14.46 | +19.81% |
| 7. hardcore punk ska | 14.20 | +19.37% |
| 8. rock and pop | 282.21 | +15.46% |
| 9. christian and gospel | 5.14 | +15.32% |
| 10. electronic | 6.54 | +14.30% |

Top Buzz Words for *music*     [ Add Category to My Buzz Index ]

Average over [just this day:] [August] [12] [2000] [Change]

FIG. 12A

YAHOO! Buzz Index

Yahoo! - Sign Out - Help

Welcome, ybuzz!                                        Preferences - My Buzz Index

Yahoo! Buzz Index
Buzz Home

Home > My Buzz Index

Search

[            ] [Search]

Current Campaigns                                  [ Back to Buzz ]

Average over [7 days ending ▼] [August ▼] [12 ▼] [2000 ▼] [Change]

August 6, 2000 - August 12, 2000 [ Daily View - Weekly View ]

| Graph | | Buzz | Change ▼ | |
|---|---|---|---|---|
| ☑ | Category toys | 334.14 | +2.87% | [ Delete ] |
| ☑ | Term nike across all categories | 13.13 | -4.48% | [ Delete ] |
| ☑ | Term reebok across all categories | 1.90 | +2.25% | [ Delete ] |
| ☑ | Term new balance across all categories | 2.10 | +5.21% | [ Delete ] |
| ☑ | Term puma across all categories | 2.17 | -1.45% | [ Delete ] |
| ☑ | Term adidas across all categories | 4.74 | +3.04% | [ Delete ] |
| ☑ | Term yahoo across all categories | 1.46 | -2.93% | [ Delete ] |
| ☑ | Term wedding across all categories | 9.84 | -8.46% | [ Delete ] |
| ☑ | Term decss across all categories | 2.33 | -7.33% | [ Delete ] |
| ☑ | Category apparel | 579.89 | +0.52% | [ Delete ] |
| ☑ | Category electronics | 387.75 | -1.51% | [ Delete ] |
| ☑ | Term honda civic across all categories | 3.66 | -1.82% | [ Delete ] |
| ☑ | Term honda prelude across all categories | 1.45 | +4.45% | [ Delete ] |
| ☑ | Term coyote ugly across all categories | 37.69 | +21.84% | [ Delete ] |
| ☑ | Term christina aguilara across all categories | 1.76 | +9.33% | [ Delete ] |
| ☑ | Term britney spears across all categories | 131.06 | +2.03% | [ Delete ] |
| ☑ | Term barnes and noble in category books | 16.09 | +5.01% | [ Delete ] |
| ☑ | Term amazon in category books | 14.46 | +0.64% | [ Delete ] |

[Change Graph]

FIG. 13

WEB SITE ACTIVITY MONITORING SYSTEM WITH TRACKING BY CATEGORIES AND TERMS

FIELD OF THE INVENTION

The present invention relates to a method and apparatus to provide statistical measurements relating to Web site activity served by a server or a set of servers where the activity relates to particular topics, terms or categories.

BACKGROUND OF THE INVENTION

A server is a computing device that responds to requests from clients. A Web server is a server connected to the global network known as the "Internet" and responds to requests received from Web clients over the Internet. As used herein, the term "Web server" may also refer to a plurality of servers organized to handle a large number of requests for a Web server, i.e., a distributed Web server system. The term "Web site" is often used to refer to a collection of Web servers organized by a business entity, individual or organization for diverse purposes. The term derives, most likely, from the language used to access a Web server. A user is said to "go to a Web site" when the user directs his or her computer (Web client) to make a request of one of the site's Web servers and to display the response to the user, even though the user and the Web client do not physically go anywhere. The user perception is that there is a location, a "site" on the Web where this data exists, but it should be understood that the term "Web site" often refers to the Web server or servers that respond to requests from Web clients, even though "site" does not necessarily refer to the physical location of the Web servers. In fact, in many cases, the servers of a Web site might be physically distributed to avoid downtime when local power outages or network service failures occur.

The term "Web site" typically refers to a collection of pages maintained by a common maintainer for presentation to visitors, whether the collection is kept on one physical server at one physical location or is distributed over many locations and/or servers. The pages (or the data/program code needed to generate the pages dynamically) need not be created by the common maintainer of the collection of pages. In places herein, such a maintainer of the collection of pages is referred to as the Web site operator. For example, an online merchant might set up a Web server with a collection of pages created by the merchant or obtained from affiliates, suppliers, or partners of the merchant and then put hyperlinks in the pages so that a visitor can browse around the "site" as expected by the merchant. As another example, an individual dedicated to dispensing information about opera or an uncommon medical condition might set up a Web server and populate it with pages about the particular subject, including such things as references to pages outside their collection of pages, dynamically generated pages of comments made by visitors, or e-mail sent to the operator of the Web server.

Although many Web sites are targeted to single topics, some Web site operators serve many different interests and have integrated many different "properties" into a large Web site, often distributed over many servers and locations to handle traffic from a large number of visitors. "Traffic," generally refers to overall network use at a given moment, or it can refer to specific transactions, records or users in a data network, as in a Packets Per Second (PPS) measurement of Internet use. As used herein "traffic" refers to use of a Web site or any of its pages over a given time. "Properties," as used herein, means categories of content provided by the Web site. For example, the Yahoo! Web site (www.yahoo.com) brings together many properties of interest under one umbrella, such as a financial property (for providing stock quotes and other financial information and data), a sports property (for providing sports scores and news), an auction property, a chat property, an instant messaging property and many others. Complex sites, where visitors come for possibly unrelated properties, are often referred to as "portal sites".

lAlthough the typical Web site includes one or more servers that receive requests and provide responses according to the HyperText Transport Protocol (HTTP), the description herein should not be understood as being limited to a particular protocol or a particular network. For example, the Web site might be connected to the Web clients by an intranet, wireless access protocol (WAP) network, local area network (LAN), wide area network (WAN), virtual private network (VPN) or other network arrangement. In other words, a Web site for which traffic is being monitored can be monitored independent of the protocols or network used. "Web" typically refers to "World Wide Web" (or just "the WWW"), a name given to the collection of hyperlinked documents accessible over the Internet using HTTP. As used herein, "Web" might refer to the World Wide Web, a subset of the World Wide Web, a local collection of hyperlinked pages, or the like. More generally, a Web server is a server responsive to requests received from a Web client.

Typically, requests and responses are considered "pages". For example, with the HTTP protocol, a Web client requests a page from a Web server and the Web server responds to the request by sending a page. In the HTTP protocol, a Uniform Resource Locator ("URL") identifies a page and that URL is presented to the Web server as part of a request for a page. The pages are often HyperText Markup Language (HTML) pages or the like. The HTML pages can be static pages, dynamic pages or a combination. Static pages are pages that are stored on the server, or in storage accessible by the server, prior to the request and are sent from storage to the client in response to a request for that page. Dynamic ("on the fly") pages are generated, in whole or in part, upon receipt of a request. For example, where the page is a view of data from a database, a server might generate the page dynamically using rules or templates and data from the database where the particular data used depends on the particular request made.

The term "page hit" refers to an event wherein a server receives a request for a page and then serves up the page. In even a moderate sized Web site, the servers might handle millions of page hits per day. A common measure of traffic at a Web site is in the number of page hits (often referred to as "page views", especially in an advertising context) for particular pages or sets of pages. Page hit counts are a rough measure of the traffic of a Web site. More refined measures include unique visitor counts, where only one page hit is counted for each unique client for a predetermined period. Such measures work well when the traffic of interest relates to particular pages, but are generally not informative when traffic by topic is desired and multiple pages may relate to one topic and one page may relate to multiple topics.

For example, where a stock information Web server serves up just a page for each stock and only one page relates to that stock, it would be a simple matter to determine levels of user interest in particular stocks by examining the server logs of the Web server to determine which stock pages are being served the most. Unfortunately, most real-world Web services are not so well defined. One more complex Web site includes servers that serve news, sports and financial content along with content on many different subjects and pages that relate to a common topic might be served from more than one of those content components. With the requests spread over different content components, the level of user interest would not be accurately reflected in a measurement of interest in just one content component. For example, interest in a particular athletic shoe company might be expressed by traffic to pages containing news stories relating to the company, traffic to sports pages referring to the company, traffic relating to financial content about the company, searches for the company's products, purchase transactions for the company's products, etc. Also, some requests might be falsely associated with interest in the company if, for example, users use a search term that has more than one meaning, one of which relates to the name of the company.

Such a Web site might also include search capability, wherein a user submits a search request using their Web client and a Web server responds with a page that contains search results. It is a simple matter for a search engine (a Web site set up to respond to search requests) to log all of the search requests. Typically, a search request is in the form of a search phrase containing one or more search terms. Search requests can be counted by search term, e.g., count the number of times "Ford" or "sports" was used as a search word in a search phrase, but such counts have limited utility where one search term might relate to multiple topics and multiple search terms might relate to one topic.

Where page hits, search requests, or other "events" such as purchases, are logged or loggable, some operators of Web sites track statistics other than just page hits or search requests. One well-known statistic often seen in Web systems, and elsewhere, is a "top-n" list, such as a "Top Ten" list. Such a list presents the n highest requested items. For example, a newspaper might list the 40 best-selling books for a given month, ranked by industry-wide sales. The list might indicate, for each book on the list, the book's ranking for the prior measurement period. As another example, a Web site operator might include a page served by the Web server(s) that lists the top sellers for that operator.

As yet another example, a Web site operator might include a page served by the Web site that shows the top-sellers for various categories. For example, if the Web site operator is a toy retailer, the operator might create pages to be served by its system wherein the pages list the top-selling toys for infants, the top-selling toys for toddlers, the top-selling toys for teens, etc. In a variation on the basic count of items sold, some Web site operators might include statistics showing how various items are moving up or down in sales. For example, a list could be presented showing the top 40 sellers for the month along with their sales rank for the prior month, or a list ranking items in order of increase in sales or sales rank.

As with the Web server that serves up specific pages for specific topics, such as one page per stock on a stock information Web site, sales statistics such as those described above are easy to generate. An electronic commerce server can simply log each purchase and then a program can scan the log for a period of time to determine sales levels for each item. The sales can also be easily categorized where the items are already categorized. For example, a book selling Web site can log all sales of books, where each book is already categorized (e.g., "fiction," "reference," "technical," "self-help," "other nonfiction," etc.) and then aggregate the sales for category to identify sales by category or top sellers within a category. However, the "top-n" or best-seller lists are limited in that the categorization of the items must be done manually or along lines that are set out ahead of time and worked into the data. Thus, such a system cannot be easily adapted to events that are not already well-categorized; it does not combine information across multiple events and types of events, nor is the information normalizable so that detailed and relative statistics can be derived.

Some traffic analysis modules have been used to analyze traffic over a Web site, but their functionality is limited. One such module performs basic statistical analysis of Web server logs to determine Web site usage. They are typically not designed to compute interest in particular topics, although the statistics they offer indirectly reflect that interest. One problem with such modules is that they either rely on manual associations of events to topics or do not associate events with topics, so the former approach is not scalable and the latter approach does not group events in a meaningful manner.

Heretofore, however, none of the statistics systems described above allows for the more sophisticated, and thus informative, measurements often needed to make overall strategy decisions with regard to trends, advertising purchases, popular culture review, product marketing and other decisions that need to be made in light of traffic statistics where the traffic relates to complex events and requests.

SUMMARY OF THE INVENTION

Using the present invention, a traffic monitor generates statistics about traffic of one or more servers and is capable of associating monitored events with topics or terms and aggregating the statistics about the monitored events into categories. Monitored events might include page hits, search requests, purchases and/or other actions. One use of such statistics is to determine trends and changes in areas of user interest, in effect detecting "buzz" (a flurry of activity) due to increased interest, where such interest is associated with a topic, term or category.

In an alternate embodiment, instead of monitoring traffic resulting from requests from any set of users to a specified set of Web servers or Web sites (operated by one or more entities), the traffic between a defined set of users to any set of Web servers could be monitored instead.

In one embodiment of a traffic monitor, events are associated with topics or terms and are grouped by category. For example, when a user provides a search server with search terms and then selects a page from search results, the resulting page hit might be associated with one or more of the search terms used. When a user arrives at a particular page after navigating a subject directory, the page hit might be associated with the subject of the navigation. By comparing changes or trends in the traffic associated with a search term or a category, the "buzz" associated with a topic, term or category can be assessed.

In a process of evaluating traffic, the raw values can be normalized to reduce the effects unrelated to the buzz around a topic, term or category. For example, while raw values for traffic are likely to grow from midnight to midday in a given geographical area as users awake and begin accessing the server system, the traffic measurement can be normalized to remove time of day variations. Other variations, such as overall traffic variations, seasonal variations, weekly variations and general topic variations (when examining buzz for more specific topics), can also be normalized out. Ratios and difference measurements might also be performed in comparing two or more topics, terms or categories to determine relative buzz.

Once "buzz" (used herein to mean a statistical measure of interest) is determined for a set of topics, terms or categories, that information can be used in many ways. For example, users might be interested in seeing the current popular terms or categories, so that they can follow trends and be informed on those popular topics. Advertisers might also be interested in buzz, since they might want to dynamically switch their advertising to follow topics having increasing buzz.

One advantage of a traffic monitor having aspects of the present invention is that the traffic monitor will group events so that a user of the statistical data can get statistics that cover events that relate to a topic without including counts for events that are not really on the same topic. Yet another advantage is that counts can be normalized for a topic or term against other topics or terms in a category.

A further understanding of the nature and the advantages of the inventions disclosed herein may be realized by reference to the remaining portions of the specification and the attached drawings.

BRIEF DESCRIPTION OF THE DRAWINGS

FIG. 3 is a schematic of a data structure used to represent counts by category and topic/term.

FIG. 4 is a schematic of a data structure for storing multiple sets of traffic data, one set per period.

FIG. 9 is an illustration of a buzz report.

FIG. 10 is an illustration of a list of vertical market topics for which buzz can be presented in the exemplary report of FIG. 9.

FIGS. 12(a) and 12(b) together illustrate a report showing buzz values for subcategories in a category.

FIG. 13 illustrates a campaign monitoring page.

DESCRIPTION OF THE SPECIFIC EMBODIMENTS

Figure 1:
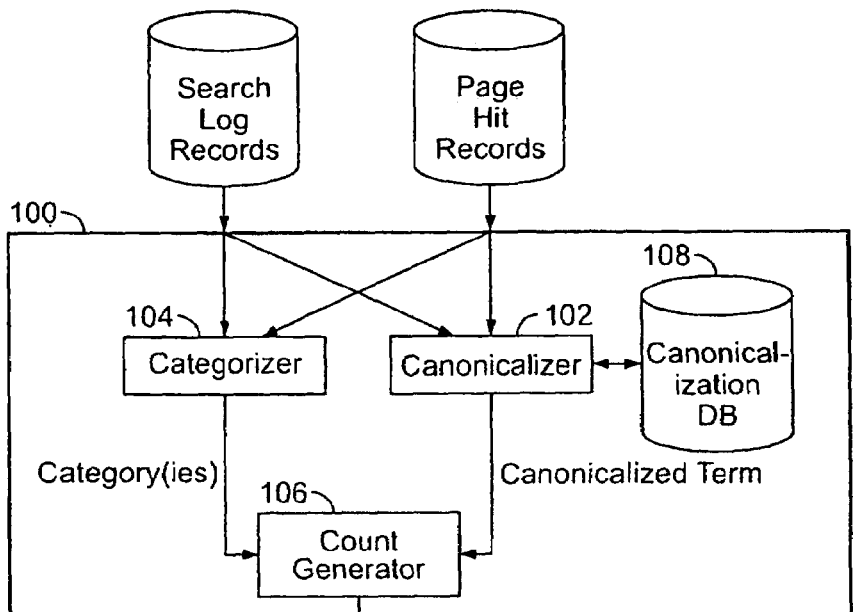
FIG. 1 is a block diagram of a Web site system including a statistical analyzer within which a traffic monitor according to one embodiment of the present invention might be used.

The following description is organized approximately according to the following outline:

1. Overview

2. Collecting Traffic and Binning by Subject 2.a. Categorization 2.b. Canonicalization 3. Examples of Sources of Data for Traffic Monitor and Uses for Collected Data 4. Uses of the Statistical Analysis 4.a. Buzz/Trend Reports 4.b. Selling Advertising Space Based on Categorizations and/or Buzz 4.c. Campaign Monitoring 4.d. Intersection Analysis 4.e. Associated Interests Analysis 5. Variations on the Basic System 1. Overview In this description, the term "buzz" refers to a measurement of the user activity that relates to a particular topic, term or category. As used herein, "subject" generically refers to one or more of a topic, a term, or a category. Thus, the topic "U.S. presidential politics", the search term "Ford" and the category "music", are all subjects for which "buzz" can be measured.

"Traffic" refers to a count, or approximate count, of the events (hits, searches, requests, purchases, etc.) that occurred for a given subject. Traffic can be measured either for a defined set of servers accessed by a possibly unconstrained set of clients/users ("selected servers/all clients"), for a defined set of clients/users accessing a possibly unconstrained set of servers ("all servers/selected clients"), or for a defined set of clients accessing a defined set of servers ("selected servers/selected clients"). For example, the selected servers might be the servers that serve content for one or more defined Web sites, the servers that are monitored by an advertising network or ratings network, the servers monitored by a university network monitoring system, etc.

"Traffic" might be a raw count of the number of events, unnormalized or otherwise, but traffic might also be measured not with one count per event, but one count per unique user (i.e., even if a particular user makes multiple requests, only one request is counted) or one count per unique user per time period might also be the measure of counting traffic. Traffic can be unnormalized, such as integer counts for the number of events, or can be normalized. One purpose for normalization is to place the number in a suitable value range for presentation or other processing. Another purpose for normalization is to normalize out variability in the counts that is likely to be variability independent of levels of user interest.

In general, monitoring traffic for any users or any servers ("all servers/all clients") is practical only in a centrally managed system and cannot currently be effected for Internet clients and servers in general. However, if logs of such activity were available, the traffic monitors and statistical analyzers described herein might be used to measure traffic and buzz in a more general setting. The examples herein largely refer to the "selected servers/all users" variation, but one of ordinary skill in the art would understand how to apply this disclosure's teachings of that variation to the other variations.

Events can be page views, search requests, purchases, requests for media such as streaming audio or video, message board actions, chat room actions, club actions, instant messaging actions, online gaming actions, or any other action that is detectable by a server of a Web site. The expected use of the traffic monitor is to monitor large numbers of events, often measuring in the millions, to discern trends and buzz. To enhance the usefulness of the results, events should be logically grouped so that the groupings will by and large have statistical significance and topical relevance. The process of grouping events is referred to herein as "binning".

Whatever the extent of the traffic monitoring (e.g., selected servers/all users), the results can be sliced up by demographic information. For example, the traffic monitor can provide the overall counts for the category "music", but the traffic monitor can also divide up the overall counts by different demographic categories, using user-provided demographic data or demographic data provided in another way. For example, the traffic monitor can provide buzz values for the demographic of males 18–45 years old, with U.S. addresses. An example of demographic information other than user-provided information is the user's client's IP (Internet Protocol) address. Examples of user-provided information include age, gender, residence location, and user preferences, such as browser type, client type, network type, etc. In addition to slicing up the data to show traffic for a particular demographic, the demographic data can be used to show how a particular count for a topic is divided up among the demographic categories.

2. Collecting Traffic and Binning by Subject

FIG. 1 is a block diagram of a traffic monitor 100 including a canonicalizer 102, a categorizer 104, a count generator 106 and a canonicalization database 108. Canonicalizer 102 is coupled to receive search log records and page hit records to determine the relevant topic for a given search request or page hit. Canonicalizer 102 might refer to canonicalization database 108 to resolve canonical terms.

In alternate embodiments, different sets of one or more server logs are used to identify the bin or bins for which counts are incremented for an event logged in the server logs. For example, the system shown in FIG. 1 might include an additional log of purchase records or streaming media downloads. Where the events to be binned are purchase events, each event can be evenly weighted or each event can be weighted according to a purchase amount.

As an example of a specific traffic collection operation, suppose that thousands of users connect to a search server and perform a search using the phrase "local weather". The search server might respond to that phrase by presenting the user with a results page including links to pages relating to weather and specifically local weather (where locality might be inferred from user preferences or other methods). The search server logs the search itself and the "clicked-through" pages from the results page. A page is a "clicked-through" page when a user notes a reference to that page on the results page and selects that reference from the results page. In a standard HTTP system, the effect of those actions is that the user's browser (or other HTTP client) requests the referenced page from the server indicated in the reference (which may or may not be a portal server) and the referenced server responds to the request with the referenced page.

If the search server serves pages from a potentially large number of pages, tracking hits for each page might result in statistics that are too fragmentary to be useful. Because of this, it is often useful to aggregate hits by subject. For example, if, one day, there are fifty requests for a local weather page for fifty different localities, it might be more informative to say that there were fifty requests for weather information than to make 50 statements that there was one request for weather in a given locality. Because of this, in the preferred embodiments, traffic monitor 222 aggregates counts into bins, where each bin is for a particular topic or term.

A given event can be binned with other events that relate to the same topic or term to achieve statistical significance and topical relevance to the counts for the topic or term, even though the events may appear to be quite different. For example, page hits for a page known to relate to the U.S. presidential elections can be binned with page hits for other pages known to relate to the U.S. presidential elections. Where the page hits are the result of a given search term, the page hits are binned with other results for the search term. In this manner, counts are accumulated for a bin associated with that topic or term. A given topic or term is associated with one or more categories; although a traffic monitor could be designed wherein a topic or term might be associated with none of the categories, but it is usually best to consider that any given topic or term falls into at least one category, even if the category is a "miscellaneous events" category or the root of a category hierarchy.

Figure 2:
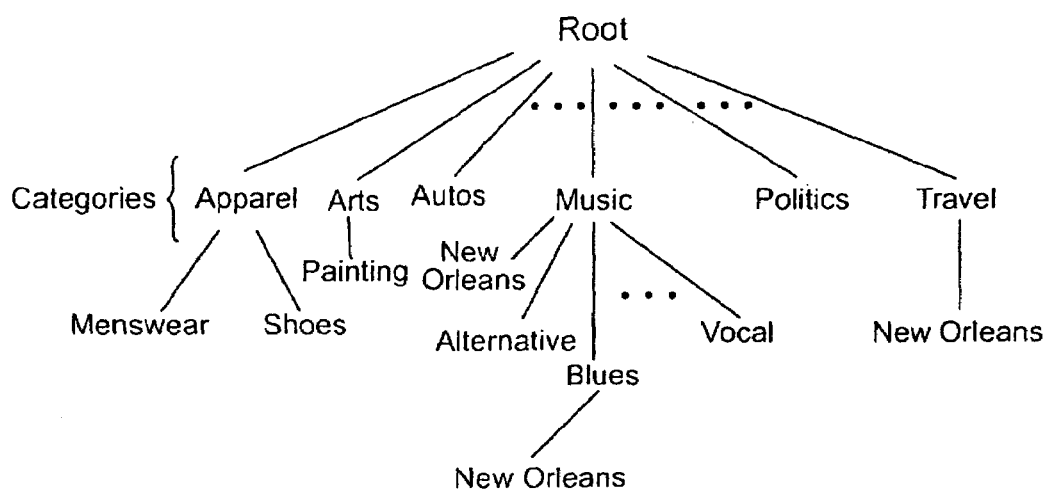
FIG. 2 is a graph of a category hierarchy, showing categories and subcategories, as well as terms associated with categories and subcategories.

In some implementations, categories are organized hierarchically, with a first level of categories, subcategories within categories and possibly subcategories within subcategories. In this hierarchical arrangement, an example of which is shown in FIG. 2, topics/terms are associated with categories and/or subcategories. Unless otherwise indicated where "category" is used herein, it should be interpreted to refer to a main category or a subcategory.

In some cases, one topic/term is present in more than one category, as with (see FIG. 2) the term "New Orleans", which is found in the categories "Music", "Blues" (itself a subcategory of "Music"), and "Travel". Typically, where one term is present in two or more categories, the term has two meanings. If the meaning can be discerned from the context, then only the count for the actual meaning of the term is incremented. In the following section, a categorizer for identifying the particular bin or bins in which to count an event is described. For example, if the context of an event was travel to New Orleans, the count for the term "New Orleans" under the category "Travel" would be incremented, but the counts for the other "New Orleans" terms would not be.

Figure 3A:
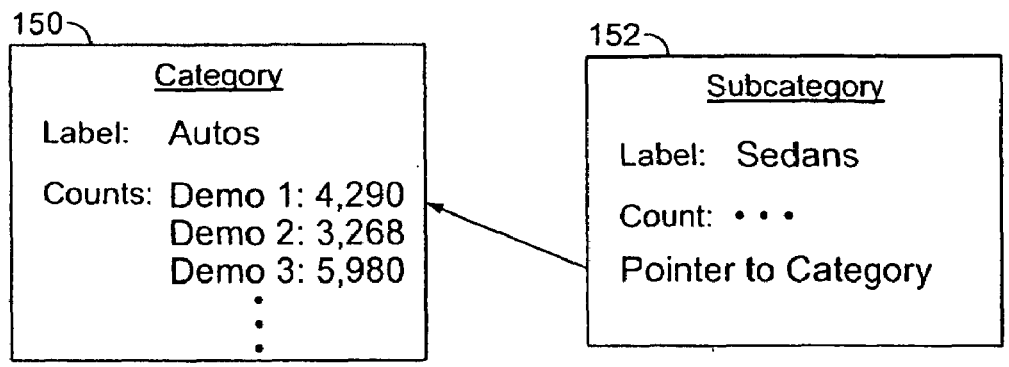
FIGS. 3(a) and 3(b) show data structures.

FIG. 3 illustrates one possible arrangement of data structures for storing the counts for bins. As shown in FIG. 3(a), a category record 150 contains data elements relating to a label for the category and counts for each of a plurality of demographics. Where demographics are not used, the category record would store just a single count. In general, since counts are for topics and terms, the category record need not contain the count(s) for the category. Instead, the count(s) for a category could be determined by summing the counts for all the terms in that category. However, in system with a large numbers of events, storing the counts for categories may result in a much faster system than if the category counts had to be calculated each time they were used.

FIG. 3(a) also shows a subcategory record 152. Subcategory record 152 is similar to category record 150 except that subcategory record 152 includes a pointer to the category for that subcategory.

Figure 3B:
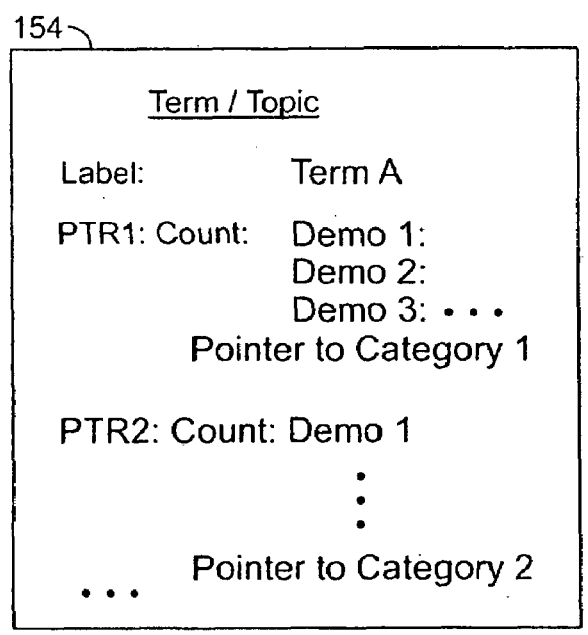

FIG. 3(b) illustrates a bin record 154 associated with a topic or term. Bin record 154 includes a label for the topic or term and includes count data for one or more categories (or subcategories). For each represented category, bin record 154 holds count data for the topic/term in that category as well as a pointer to the category.

FIG. 4 illustrates a data structure 170 that might be used to store multiple sets of traffic data, one set per period. In this example, the period is daily, so data structure 170 stores a collection of category/subcategory records and bin records for each of a plurality of dates.

2.a. Categorization

Categorizer 104 determines the bin or bins that have their count incremented for a particular event. For example, where the event is a search request using the search phrase "formula one" and the search results page lists pages related to algebra and auto racing, the search might be categorized under mathematics or sports. However, categorizer 104 correlates searches with search results selected, so that when the logs show that the user selected from the search results a page relating to auto racing, categorizer 104 allocates that event to the "auto racing" category and the "formula one" term in that category. Where terms remain ambiguous even after selection of a page (or if the user does not select a page from a search results page), categorizer 104 might output fractional counts for more than one category with suitable weights summing to one.

In some cases, the category associated with a page hit or a search are readily determinable by the state of a visitor's server session. For example, if the user is navigating a search directory by category/subcategory using a search term and then selects an entry under a subcategory, then the count for that event is readily allocable to the bin for the search term under the category and/or subcategory previously assigned to that entry. For example, if a user navigates the Yahoo! search directory path "Top: Sports: Regional Sports: San Jose" using the search term "scores" and selects a page from the result, then the categories and subcategories that get the count are readily ascertainable.

However, with direct searches with words having multiple meanings, the category might not be so apparent. For example, if the user started a search within the Yahoo! search path "Top:" and requested a search on "Ford" and "Michigan", the category is unclear because the visitor might be interested in the Gerald R. Ford Library in Ann Arbor, Mich., or the visitor might be interested in the Ford Motor Company, which has offices in Michigan. One method of resolving the ambiguity is to examine the resulting clickstream. For example, a Yahoo! search directory search using the search phrase "Ford Michigan" might return several matches, including those shown in Table 1.

TABLE 1

Regional > U.S. States > Michigan > Cities > Ann Arbor > Education > College and University > Public > University of Michigan > Libraries and Museums
Gerald R. Ford Library
Regional > U.S. States > Michigan > Metropolitan Areas > Detroit Metro > Business and Shopping > Shopping and Services > Automotive > Dealers > Makes
Ford When a user is presented with the entries shown in Table 1 and selects the first clickable link (Gerald R. Ford Library), the categorizer would assign the count for the event to the "Libraries and Museums" subcategory (and to each higher level subcategory if such tracking is performed). However, if the user selects the second clickable link, the categorizer assigns the second category/subcategory path shown in Table 1.

When the categories tracked by the statistics monitor overlap the category structure of the search directory, the task of assigning counts is complete. However, where the structure of the statistics monitor does not overlap the structure of the search directory, some additional steps may be performed. For example, if the statistics monitor had categories for each U.S. state and categories for each U.S. President, then the count for the search term "Ford Michigan" followed by a click on the first clickable link in Table 1 might result in the statistics monitor assigning half a count to the category for Michigan and half a count to the category for former U.S. President Gerald R. Ford.

In a more precise implementation of such a system, the counts might not be even. Continuing with the example of Table 1, more than half a count might be assigned to the more likely category of interest and the remainder to the other category. Thus, one might expect that a click on a link to the Gerald R. Ford Library is more likely to reflect an interest in the library as opposed to an interest in Michigan, where the library happens to be located.

The search engine for the search directory returns a list of matches with one or more clickable link per match. Generally those links can be categorized into one of three categories: 1) internal pages, 2) external pages categorized internally and 3) external pages not categorized internally. A Type 1 link is easily categorized by assigning a category to the page pointed to by the link. A Type 2 link does not have an explicitly assigned category, but can be categorized because the referenced page is referenced elsewhere on the portal site by a Type 1 link. The categorization for Type 1 links is easier than categorizing all possible search terms, and may have already been done if the search directory is organized by subject, as with the Yahoo! search directory.

Figure 5:
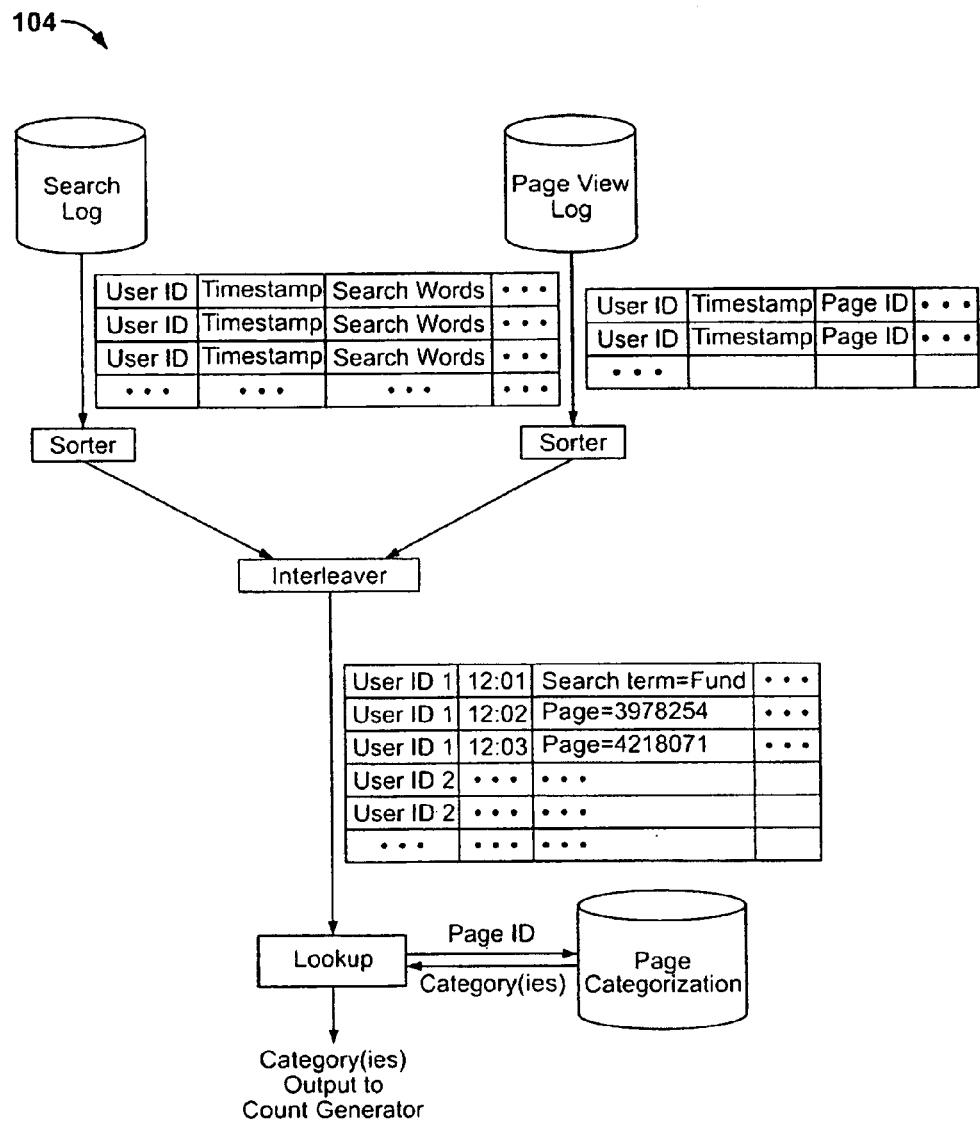
FIG. 5 is a schematic diagram of a canonicalization system.

FIG. 5 illustrates one process to categorize search words for Type 1 and Type 2 links based on the link selected. Type 3 links can be binned as well, if some category indication is present or a categorization engine that handles such links is used to identify their categories. As shown, a categorizer would extract the search word events (user ID, timestamp, search words) from search logs. The user ID can be implemented as a unique cookie stored in the user's Web browser that is sent to the search engine and Web page server with each request and is stored in the logs.

The categorizer also extracts from page view logs the user ID, timestamp, page ID, etc. for each page view. After sorting both of the extractions by time, the categorizer can interleave the extractions and determine which page is viewed after a user views results of his or her search. From that determination, the categorizer can look up the category of the viewed page and that category can be attributed to the search. Where the search is being tracked for buzz evaluation or other counting evaluation, the category count is incremented. Where a category cannot be determined; the event can be ignored for monitoring purposes.

In previously developed categorizers, the search terms are used to identify the category that gets credit for the hit, but using the above method, the category is identified from the page that is visited after the search, eliminating the need for complex semantic analysis to resolve ambiguities or manual categorization of search words, which is not scalable to a large system.

As an alternative to the method described in FIG. 5, the links on the search result page can be rewritten to include "redirects" (i.e., intermediate commands executed upon a click) that log the page ID and search phrase, so that only one log is needed. With one log, the sorters and interleaver are not needed.

Either way, the categorizer finds the meaning of a search term that the user ascribes to the term, in an inherently scalable way.

2.c. Canonicalization

When dealing with search words, it often makes sense to combine information about similar terms that are intended to produce the same results. For example, a term may be misspelled, or it may have words in a different order than another, or it may contain nonessential words such as "the". The process of reducing such terms to a common, standard form is known as canonicalization. Many processes are known for performing canonicalization, ranging from less aggressive processes such as removing certain punctuation characters or so-called "stop words" such as "of" and "the", to more aggressive processes such as adding, changing or deleting letters within words.

The canonicalization process might be performed by canonicalizer 102 that is part of traffic monitor 100 (see FIG. 1). As an example, canonicalizer 102 might canonize the search phrase "Denver whether" to "weather" by inferring that a spelling error occurred. As with categorizer 104, canonicalizer 102 uses-user behavior to improve the canonicalization process. Using user behavior is inherently scalable because there are generally proportionately more users to give human input as the system grows larger to handle more traffic.

Using user behavior (a large increase in number of searches) also allows more aggressive canonicalization. For words whose search usage has rapidly increased, more aggressive canonicalization techniques can be used. In addition, when combining information (such as number of searches) about such aggressively canonicalized terms, the system does not just add the values, but transfers the portion of the value that exceeds a prior baseline value to the canonicalized term, leaving the remainder attached to the raw, uncanonicalized term. For example, if "Concord" (Massachusetts) has a current value of 420 and is to be combined with "Concorde" (the airplane) with a current value of 825, and "Concord" had a prior baseline value of 130, we transfer a value of 290 (420-130) to the canonicalized term, ending with "Concord" at 130 and "Concorde" at 1115.

The baseline value can be defined as the average of the value for a previous period. In one embodiment, the baseline value is retained. If the value for the term being combined declines to its previous baseline, the terms are no longer merged. Combining only the values over baseline more accurately reflects reality for terms with multiple meanings.

Figure 6:
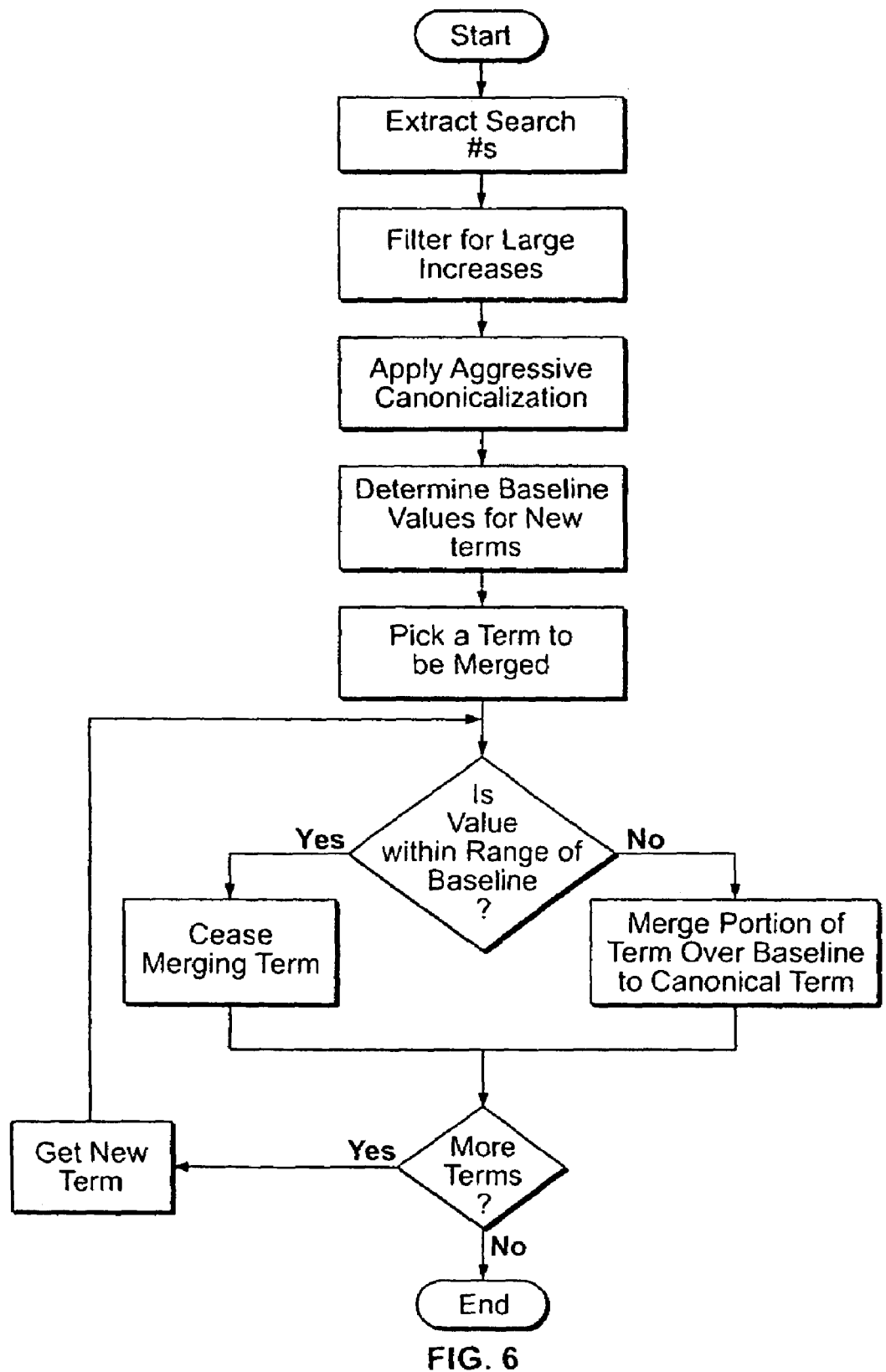
FIG. 6 is a flowchart of a process for categorizing search words.

FIG. 6 illustrates a typical implementation of a canonicalization process. The aggressive canonicalization step might include adding, changing or removing letters from search terms. If the value of the term being merged is within some margin, such as 20%, of its baseline, the term is no longer merged. Terms (or fractions of the values of terms) are merged when they are likely to be about the same topic. In the case of rapidly changing terms, it is unlikely that two similar-appearing but conceptually different terms will both have rapid rises at the same time. Thus, it is possible and desirable to merge similar-appearing terms that both have rapid rises, since they most probably relate to the same concept or topic.

For example, the term "U.S. Open" might exhibit rising interest. If the term "U.S. Open Golf" is also exhibiting rising interest, but the term "U.S. Open Tennis" is not, the canonicalizer assumes that term "U.S. Open" and "U.S. Open Golf" refer to the same subject and can be combined but "U.S. Open" and "U.S. Open Tennis" should not be combined. Once the interest levels in "U.S. Open Golf" or "U.S. Open" fall back to around their baseline, the canonicalizer would separate these terms again, to bin them separately. This would provide a desirable system response, at least for the above example, because depending on the timing of the U.S. Open sporting events, "U.S. Open" might relate to "U.S. Open Golf", then fall back near its baseline and then rise along with "U.S. Open Tennis", at which point "U.S. Open" would be associated with the "U.S. Open Tennis" category.

Thus, the canonicalizer would respond to canonicalizations that change over time, as is often the case in the real world of user interests. When combined with other elements of a traffic monitor, the buzz values for terms that reflect actual user interests are readily available for use by the canonicalizer to determine which topics/terms to merge and when.

Figure 7:
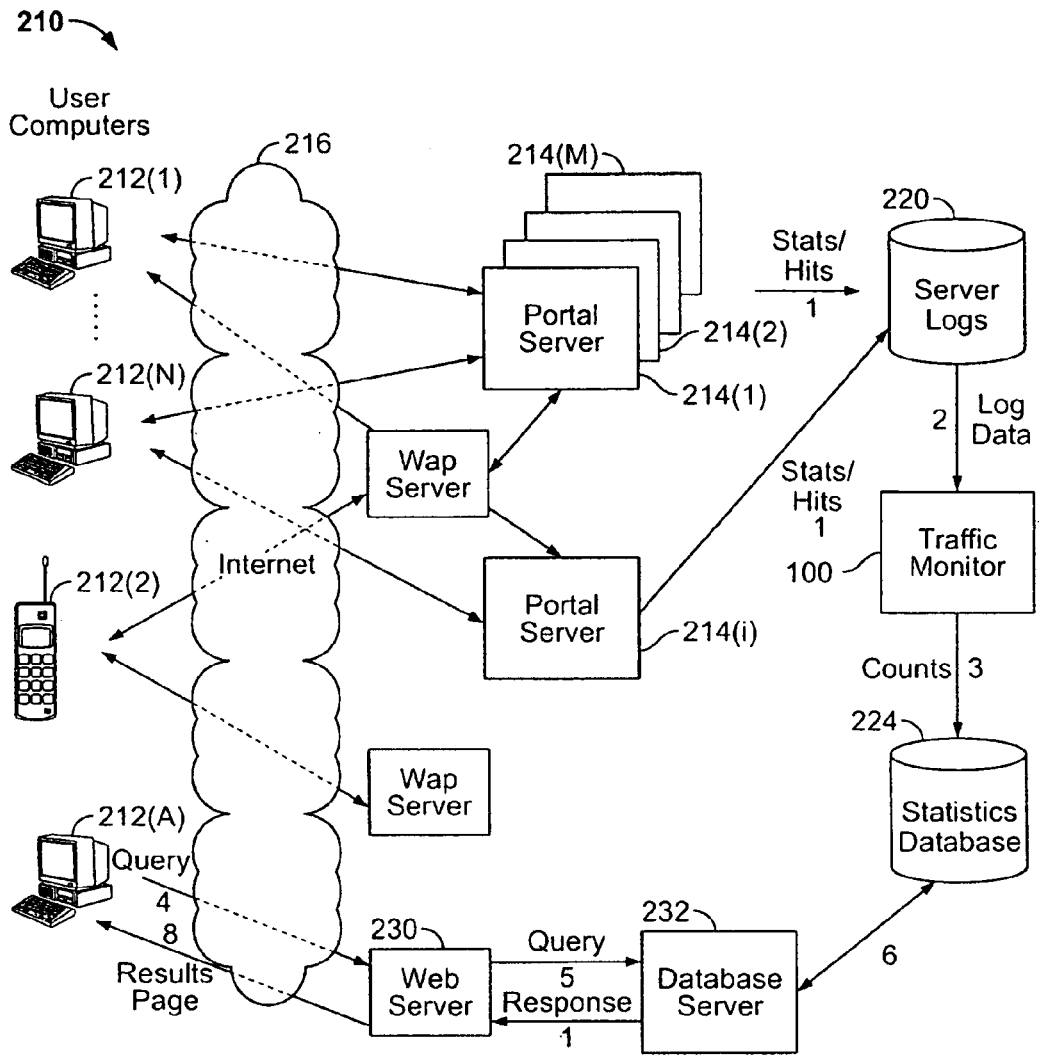
FIG. 7 is a block diagram of server system including a traffic monitor according to one embodiment of the present invention.

3. Examples of Sources of Data for Traffic Monitor and Uses for Collected Data FIG. 7 is a block diagram of server system 210 including traffic monitor 100 according to one embodiment of the present invention. In server system 210, users connect to servers 214 by connecting user (client) computers 212 to servers 214 through a network 216. In a specific implementation, user computers 212 are Internet-connectable computers (desktop computers, laptop computers, palm-sized computers, wearable computers, set-top boxes, embedded TCP/IP clients, and the like), servers 214 are Internet-connected servers responsive to requests at an URL designated by the portal operator and network 216 is the "Internet". The typical computer 212 includes a browser or other HTTP client that provides a user with HTTP access to the Internet and the Web.

The details of how user computer 212 connects to server 214 and how server 214 is selected are not shown here, as many such arrangements exist and the present invention is not limited to any particular client-server arrangement. In the figures, distinct instances of like objects are distinguished with parenthetical indices. For example, user computer 212 might refer to 212(1) or 212(n). As used herein, "n" refers to an indeterminate integer where the actual value of the integer is not relevant and may depend on details not relevant here. It is used in various contexts and the value of "n" may be different in each context, unless otherwise indicated. For example, the user computers in FIG. 1 are shown ranging from 212(1) to 212(n) and the servers are shown ranging from 214(1) to 214(n). Thus, one can infer that there are an indeterminate number of user computers and servers and the actual number is not relevant for the purposes of this description, but one should not infer that the number of user computers and servers must be the same.

FIG. 7 shows, in addition to user computers 212 and servers 214, several other components, such as storage for server logs 220, traffic monitor 100 with inputs for reading server logs 220 and outputs for count data to be added to a statistics database 224. Web server 230 coupled to network 216 and a database server 232 that is, in turn, coupled to statistics database 224 are also shown.

In a typical operation, a user connects a user computer 212 to a server 214 and requests one or more pages, each page being identified by an URL. Because of the user perception of this process, it is often described as a visitor going to a particular page on a Web site as defined by an URL. However, the visitor does not actually move anywhere and there might not be a physical "site" that can be pointed to as the place that is visited. Nonetheless, such analogies have become quite common and are used herein. Thus, it should be understood that the act of a user or "visitor" going to a page on a site is normally an act of the user directing its computing device to request through a network a page specified by the URL and maintained on a server specified in the URL or in the request, along with the method of receiving a response from the server and possibly displaying it or processing it.

In current use, even the term "page" is somewhat of an analogy to the beginnings of the World Wide Web, when the requests were for page files stored in directories on the server specified in the URL. However, in current use, "page" refers to what is returned by the server and thus a page might be data that is not even in existence at the time of the request (e.g., dynamic Web pages).

One possible order of events is now described with reference to FIG. 7. The events described below correspond to circled numbers in the figure, which are parenthetically referenced in the text below. One of ordinary skill in the art will recognize, after reading this disclosure and reviewing the figures, that other orders of events are contemplated by this disclosure and many equivalents can be inferred from the figures and text.

The events illustrated by the circled numbers begin with a process of logging page hits (1) occurring on servers 214. Many of the details of the logging process are described in further detail above. Once the server logs are created, traffic monitor 222 reads the logs to identify counts of hits by subject (2) and store those counts in statistics database 224 (3). The next event is when a user issues a statistical query relating to buzz (4). As shown, the user issues the query using user computer 22(a), but it should be understood that any computer or computing device with sufficient rights and capabilities, including user computers 212(1) through 212(n), could be used for buzz queries. From whatever source, Web server 230 receives the request for buzz statistics and translates the request into a database query, which is presented to database server 232 (5). In response, database server 232 reads data from statistics database 224 (6) and returns a database result to Web server 230 (7). Web server 230 then formats the database result into a Web page and delivers that page to the requesting user computer (8). An example of such a delivered page is shown in FIG. 9. That example page is responsive to a request for top buzz values for overall events and events specific to the categories of movies, music and sports.

Note that, depending on the device making the request, what is returned by Web server 230 might not be in the form of an HTML page, but would typically be in a form usable by the requesting device. For the purposes of providing at least one specific detailed example, this description assumes that user computers 212(1)–(n) are HTTP clients and request pages interactively from servers 214, and that user computer 212(1) is also an HTTP client and interacts with Web server 230 in a conventional manner. Although it should be understood that when many querying devices are in use, Web server 230, and possibly database server 232, might be replaced with arrays of servers to handle the load of statistical queries.

In one embodiment of a traffic monitor described herein, the monitor operates off usage logs generated by a Web site's servers. Notwithstanding that description, it should be understood that the monitor might operate off other indications of traffic, such as real-time page hits, click streams, purchase records or database records. Furthermore, although the traffic monitor is shown as a unified system, a distributed traffic monitor might be used where such distribution aids in making the traffic monitor scalable and less computationally complex, all without necessarily departing from the scope of the invention. It should also be understood that the present invention is not limited to a particular Web site or collection of Web sites, although many of the examples show examples from a specific Web site, namely the Yahoo! Web site.

4. Uses of the Statistical Analysis

As described above, a "buzz" value represents the level of interest of a subject, such as a movie, a person, product, place, or event, cultural phenomena, etc., and change in buzz value might be indicative of a trend. The buzz value can be calculated as the number of unique users searching for that subject anywhere on a portal site or set of portal sites, or viewing a page of content relevant to that subject anywhere on the portal site or set of portal sites. As described herein, buzz might also be calculated without regard to whether each event that is counted is originated by a unique user.

The buzz values can be used to identify cultural trends, track interest in specific brands, measure the effectiveness of marketing campaigns, etc. For buzz events that are purchase events, the count by which a bin is incremented might be a function of purchase amount, so that purchases of larger amounts have more of an effect on a product's buzz than purchases of smaller amounts.

In one variation, the buzz value associated with a particular term or category is the number of users searching with that term, or viewing a page related to that term, divided by a sum of users searching, where the sum can be the sum of users searching over all subcategories in a category, sum of users searching over all terms in a category, or the sum of all users searching anywhere on the site. The latter normalization is useful to factor out time-based increases in traffic, such as weekday-weekend patterns, seasonal patterns and the like. A normalization factor might be applied to all terms being compared so that the buzz values are easily represented. For example, if there are four terms in a category, 100 total unique user hits on those four terms (25, 30, 40 and 5, respectively) out of one million total unique users, a normalization factor of 100,000 might be applied so that the buzz values are 2.5, 3, 4 and 0.5, instead of 0.000025, 0.00003, 0.00004 and 0.000005. Normalization can also be used when determining the buzz surrounding one company or product against an index of other companies or products within a particular market segment or product category.

In some cases, the buzz values for a subject might be a leading indicator for electronic commerce transactions relevant to that subject. For example, the buzz for the term "widget" might rise and be followed by increased on-line purchases of widgets. Such information is useful to advertisers interested in having their brands of widgets be selected, as well as fulfillment managers eager to have in stock the latest trendy items.

Buzz values can be presented from overall data or it can be isolated to specified demographic groups. Thus, with enough traffic, the traffic monitor can track the top buzz among women aged 33–45, the top buzz for "newbies" (people who are new to the online world), buzz by country or by regions of countries. In addition to just a buzz number, the system might also provide a commerce index to show how different vertical markets or products are growing/shrinking over time.

While advertisers and other businesses might find the buzz values to be useful, key marketing feedback data and thus be willing to pay for the data, other buzz values might be made available to consumers or to the general public for free or at a nominal cost. For example, the Web site operator might opt to provide general access to the buzz relating to current movies and rock stars while providing more restrictive access to data relating to a particular marketing campaign being tracked by the operator for the company that launched the campaign.

4.a. Buzz/Trend Reports

Figure 8:
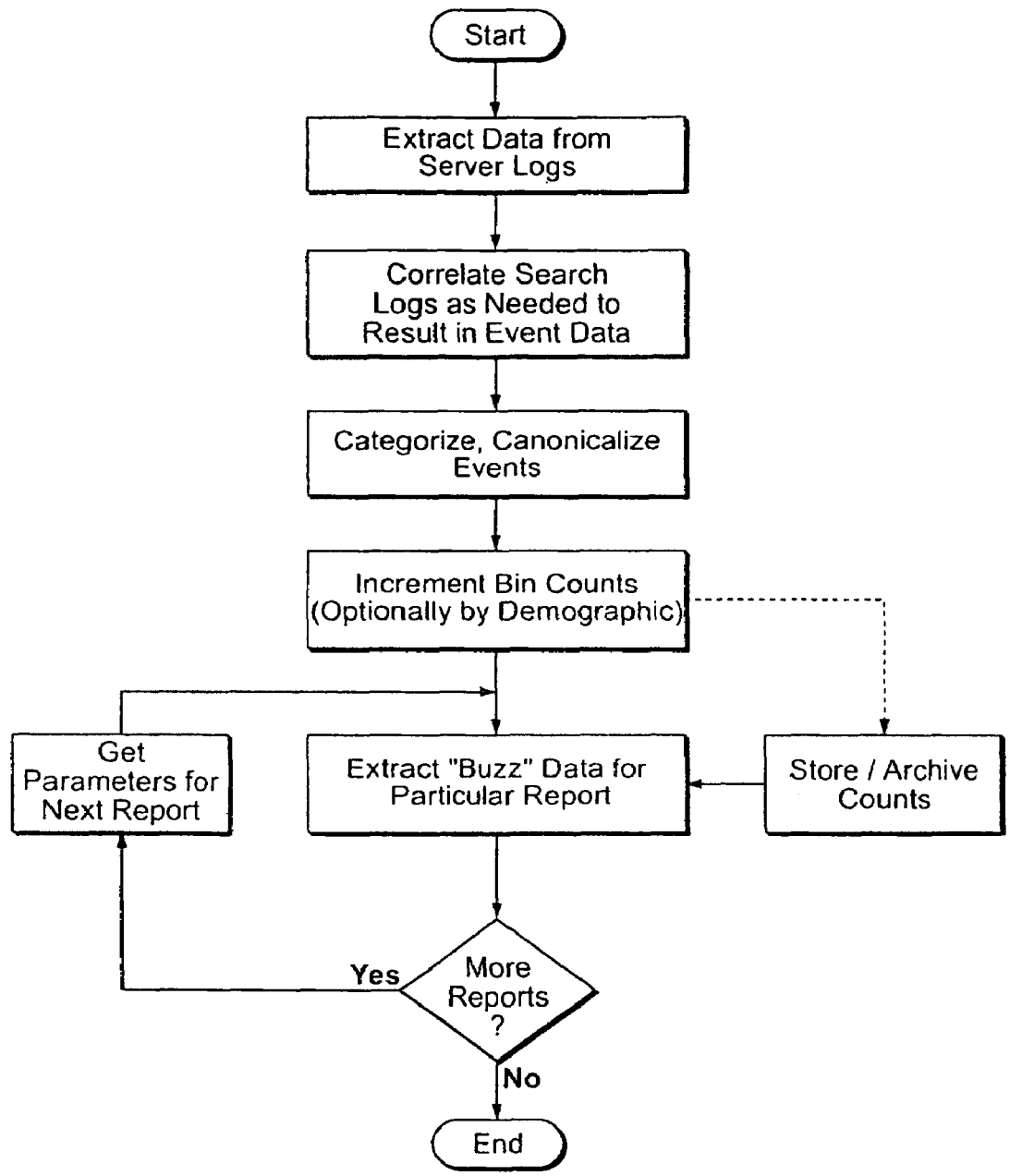
FIG. 8 is a flowchart of one process for generating buzz/trend reports.

FIG. 8 is a flowchart of one process for generating buzz/trend reports.

One example of a buzz report is shown in FIG. 9. That report has a section for buzz values (normalized from the counts) for overall terms as well as sections for the categories of movies, music and sports. For each section of the report, the report shows the top few topics/terms that generated the most counts, in order of number of counts, along with an indication of relative change in buzz values. When implemented as a hyperlinked page, the report also includes links to a list of categories (the link is denoted by "A" in FIG. 9 and the "linked-to" page is illustrated in FIG. 10), icons to change the sort order, as well as related links related to the particular topic/term (e.g., news, categories and sites relating to the topic/term).

As shown in FIG. 10, although the counts might be separated in a bin record by category (see FIG. 3(b)), the counts can also be aggregated over all categories.

Figure 11:
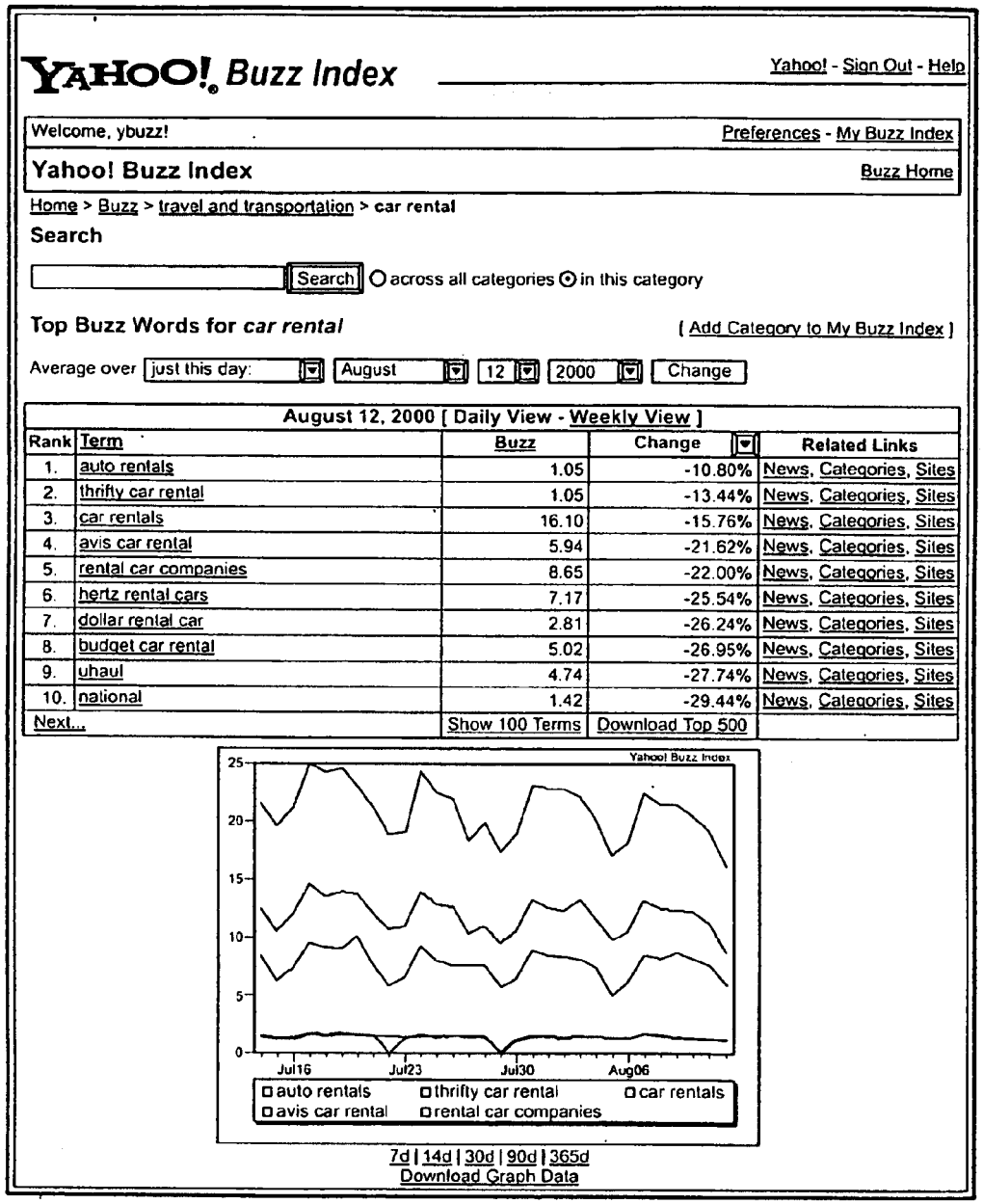
FIG. 11 is an illustration of a report where the buzz for terms is plotted over time and relative to other terms in a category.

Another buzz report is shown in FIG. 11, where the buzz for terms is plotted over time and relative to other terms in a category.

Figure 12B:
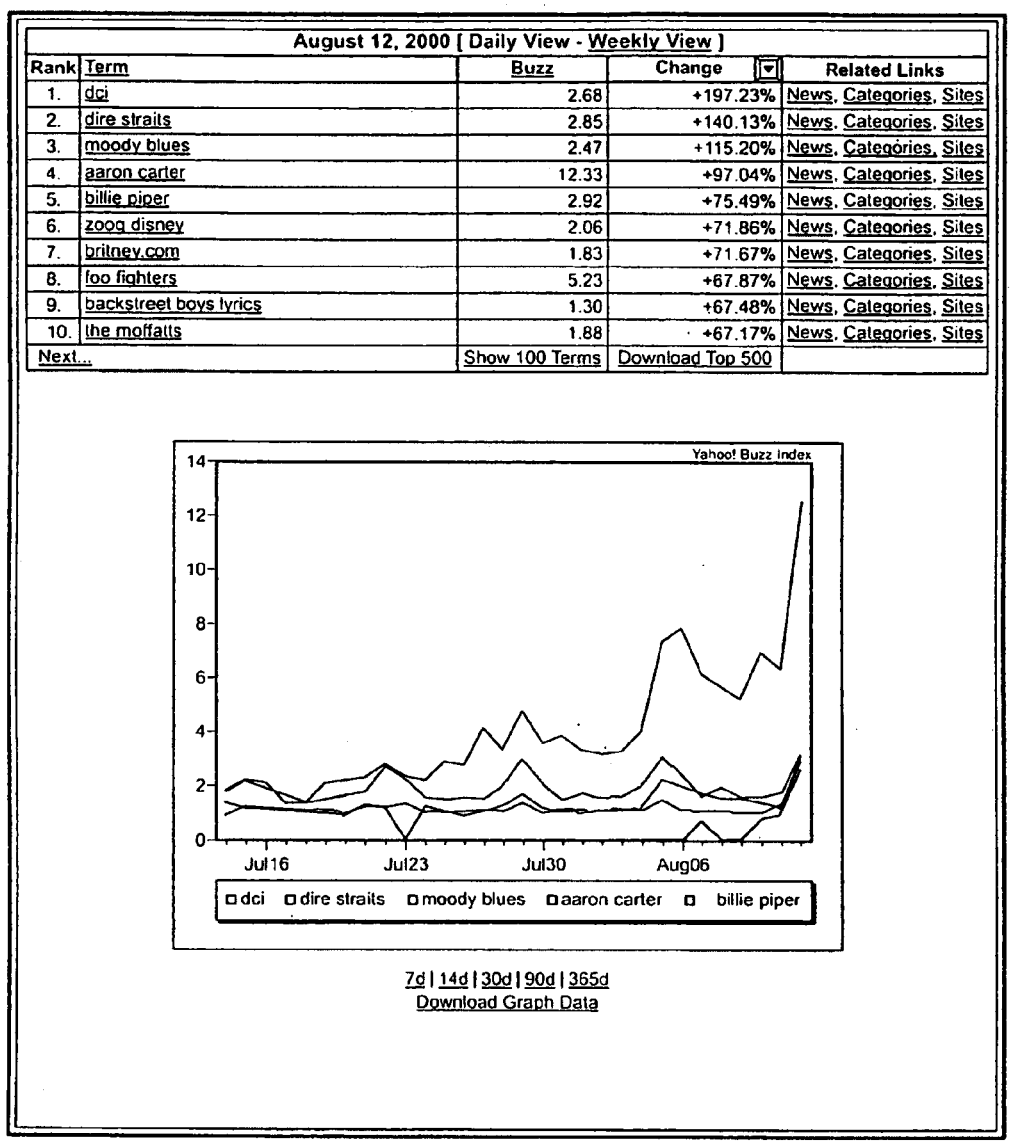

FIG. 12 illustrates yet another buzz report, showing buzz values for subcategories in a category. As shown in FIG. 12(a) the subcategories are for the category "Music" and are sorted by percentage change in buzz value. FIGS. 12(a) and 12(b) together form the full report. FIG. 12(b) shows the buzz for terms over the category "Music". A link to a customization page is provided ("Preferences") as well as a link to a user-specific buzz index ("My Buzz Index").

In general, there are many ways to present the data generated by the traffic monitor. Buzz values can be "sliced" by demographics to illuminate demographic information about the users searching for a particular search term. Buzz values might be sliced by method of access, such as wireless or broadband access. Buzz values can be presented in various sort orders such as "buzz score" or by the "% change in buzz" for a specified period. Buzz report users can easily determine, for a particular demographic or overall, what topics or search terms get more attention and where the spikes in attention occur over time.

In one application, a buzz report generator generates buzz reports on the fly based on requests from the buzz report generator users. Thus, such users can request and receive customized views of buzz by segments. A buzz report generated by the buzz report generator can be presented for any type of user segments that can be defined by user characteristics, such as demographics, lifestyles, interests and/or geographic location.

Demographics of users may also be used as added data rather than just as a way to slice the data. For example, a demographic report might indicate that of all the registered users causing events for a given term (i.e., searching using that term), X % are women, Y % are within the ages of 18–25, etc.

4.b. Selling Advertising Space Based on Categorizations and/or Buzz

Categorizing search words has many applications, such as selling advertising space on search results page for searches on a large number of words. This would allow a car manufacturer to specify that its advertisement be shown whenever a search phrase is categorized in a car category. For example, if a visitor searches for "Dodge" and previous user behavior (over possibly many users) had indicated that "Dodge" can be categorized in an automobile category, the advertisement would be shown.

Another use of buzz in relation to advertisements is an application that generates the text and/or other creative components of the advertisement and does so as a function of the top buzz subjects or products for a category of interest to a visitor to a Web site. For example, if a visitor to a site demonstrates interest in "rap music", the application would generate an advertisement that took into account the top buzz for a rap band, such as generating an advertisement that highlighted the offerings of that top rap band.

4.c. Campaign Monitoring

Figure 14:
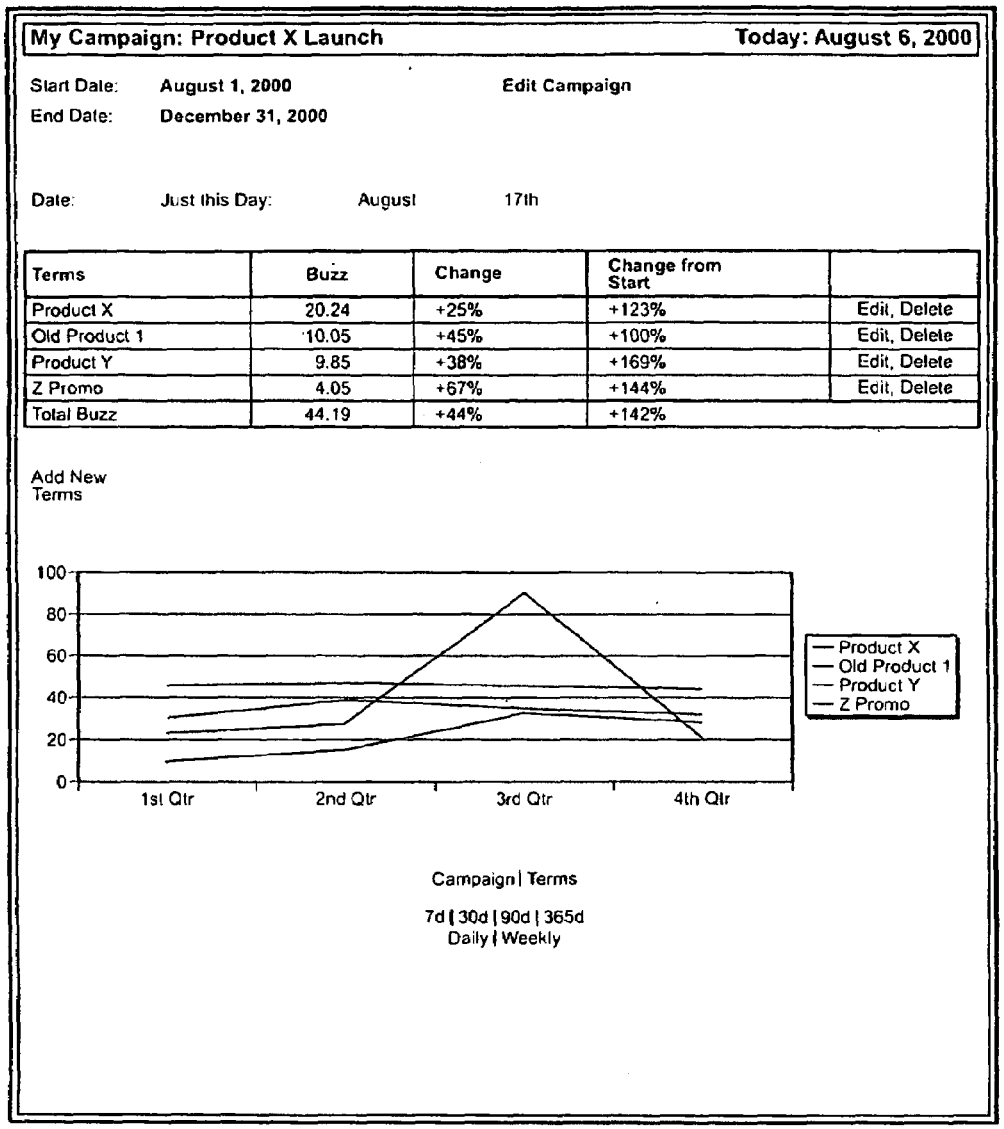
FIG. 14 illustrates a campaign monitoring report.

Campaign tracking allows users to measure the impact of their marketing campaigns on generating online buzz. FIG. 13 illustrates a basic campaign monitoring page. Pre-campaign buzz can be compared with buzz during and after the campaign, as shown in FIG. 14.

4.d. Intersection Analysis

Figure 15:
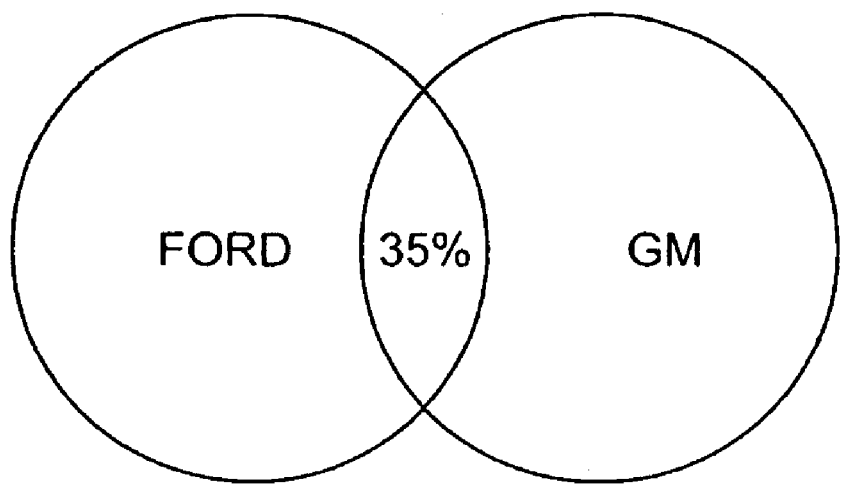
FIG. 15 illustrates intersection analysis.

FIG. 15 illustrates intersection analysis. Intersection analyses of the demographics of users searching for two terms allows users to identify any overlaps between groups of users searching for multiple terms or brands (e.g., Ford and GM, or Britney Spears and Christina Aguilera).

4.e. Associated Interests Analysis

Figure 16:
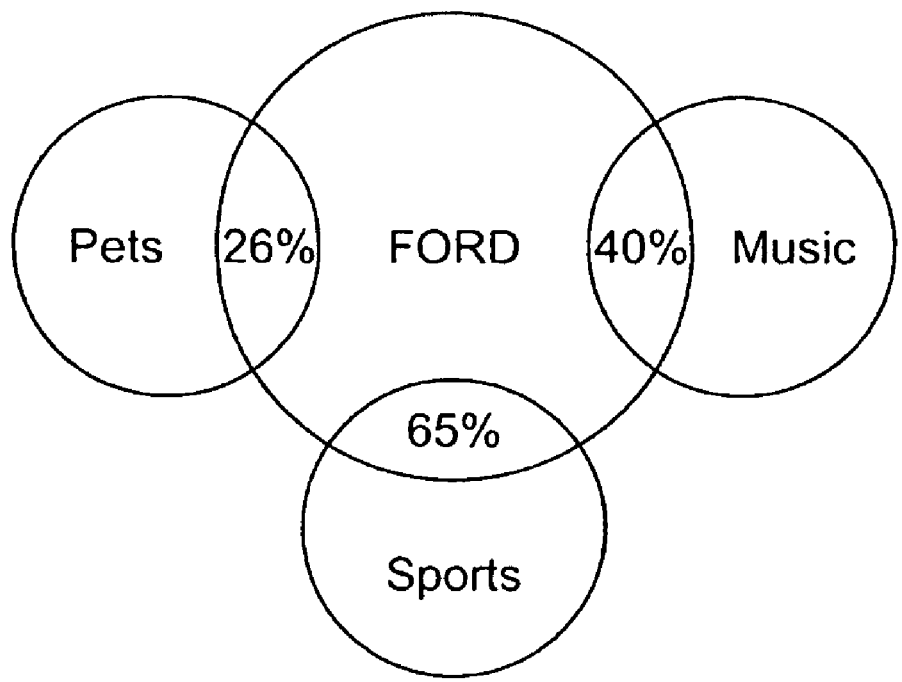
FIG. 16 illustrates associated interests analysis.

FIG. 16 illustrates associated interests analysis. Associated interests analysis indicates the other interests of users searching for a particular term. For example, of those people searching for Ford, the other terms/categories they are searching for can be tracked.

5. Variations on the Basic System

The above description is intended as a thorough teaching of how to make and use a statistics monitor and several exemplary variations. The above description is not intended to be exhaustive of the possibilities. For example, the above description generally assumes that the interconnecting media between the users and the monitored site is the Internet, but the Internet can be replaced with other media without departing from the scope of the invention, such as a non-TCP/IP network, a local area network (LAN), and intranet, a virtual private network (VPN), or a wireless-access protocol (WAP) network. While the above systems may have been explained with reference to a particular criteria for counting, such as only one count per unique user per day, other criteria might be used, such as incrementing once every time a user causes an event, or once per user per day.

The above description should not be construed to be limiting to particular computing devices, as the statistics monitor might monitor visits by users with WAP devices, handheld computers, embedded computers, laptop computers and Web-enabled devices, to name a few. In a practical system, the monitor might handle multiple types of devices and might even track statistics by device type or track different device types differently.

The pages being viewed need not be HTML, but might be dynamic server pages, ASP pages, for example. Moreover, the "buzz" is not the only statistic that can be tracked. For example, some other variable can be tracked. In a particular example, results from the statistics monitor might be used to calculate a charge to the user where the page views are not free but are related in some way to the statistical results.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus for tracking aggregate web trends, comprising:
   canonicalization logic for canonicalizing events into canonical terms, wherein the events reflect activity by a plurality of users on at least one server and occur over a period of time;
   categorization logic for aiding in categorization of each canonical term into at least one category;
   term counting logic for incrementing a count associated with each canonical term for each event associated with that canonical term; and
   normalizing logic operable to form statistics relating to aggregate interests of the plurality of users in each canonical term over the period of time.

2. The apparatus of claim 1, further comprising category count logic for incrementing a count associated with each category for each event associated with canonical terms categorized into that category.

3. The apparatus of claim 1, wherein the normalizing logic is operable to form statistics reflecting aggregate changes in interest of the plurality of users across categories.

4. The apparatus of claim 3, wherein the normalizing logic is operable to form a ranked list of canonical terms exhibiting highest aggregate change in interest across categories.

5. The apparatus of claim 1, wherein the normalizing logic is operable to form a ranked list of canonical terms exhibiting highest aggregate change in interest in a selected category.

6. The apparatus of claim 5, wherein the normalizing logic is operable to accept a limitation on the period of time over which the events took place, and to form a ranked list of canonical terms exhibiting highest aggregate change in interest in the selected category over that limited period of time.

7. The apparatus of claim 1, wherein the statistics include percentage changes in aggregate user interest in each canonical term, and statistics indicating current aggregate user interest in each canonical term.

8. The apparatus of claim 7, wherein the statistics include percentage changes in aggregate user interest and current aggregate user interest in canonical terms in a selected category, and further comprising a user interface operable to accept a selection to sort the canonical terms in the selected category by one of current aggregate user interest and percentage change in aggregate user interest.

9. The apparatus of claim 1, wherein the normalizing logic is operable to accept limitation on the period of time over which the events took place, and to form a ranked list of canonical terms exhibiting highest aggregate change in interest over that limited period of time, and to form current aggregate interest level statistics for each of the ranked list canonical terms.

10. The apparatus of claim 1, wherein the statistics include percentages of aggregate change in interest for each category, and statistics indicating current aggregate user interest in each category.

11. The apparatus of claim 10, wherein the statistics further include a ranking of the percentages of aggregate change in category interest among a selected portion of the categories.

12. The apparatus of claim 1, further comprising a database with demographic information for at least a portion of the plurality of users, and wherein the statistics include statistics reflecting aggregate change in interest for each canonical term in a selected category for users having at least one selected demographic characteristic for which information exists in the database.

13. The apparatus of claim 12, wherein the statistics include statistics reflecting aggregate change in interest in each category for users having the at least one selected demographic characteristic.

14. The apparatus of claim 12, wherein the statistics include statistics reflecting aggregate change in interest for a canonical term across categories for users having the at least one selected demographic characteristic.

15. The apparatus of claim 1, wherein the events include a click stream input received from one of the plurality of users in response to search results provided to that user based on a canonical term, and the categorization logic, based on the click stream input, is operable to categorize the canonical term into another category.

16. The apparatus of claim 1, wherein the events include indications of page views, indications of search terms and indications of click streams received from users of the plurality in response to search results provided in response to canonicalized search input.

17. The apparatus of claim 1, wherein the statistics include aggregate changes in interest and current interest levels of the plurality of users for selected canonical terms across at least a portion of the categories, and further comprising a display illustrating a list of the portion of the categories, both the aggregate changes in interest and current interest levels for the selected canonical terms, and navigable links for further information relating to the selected canonical terms.

18. The apparatus of claim 17, wherein the further information includes categories in which the selected canonical terms have been categorized.

19. The apparatus of claim 17, wherein the portion of the categories includes a set of vertical market categories.

20. The apparatus of claim 1, further comprising an interface operable to receive a selection of at least one canonical term and at least one category, and further comprising a result output operable to display both the aggregate changes in interest and current interest levels for the at least one canonical term and the at least one category.

21. The apparatus of claim 20, wherein the selected at least one category is a subcategory of another category, the another category is associated with other subcategories, and further comprising a result output operable to display aggregate changes in interest in the other subcategories.

22. The apparatus of claim 1, wherein the categorization logic is further for aiding in categorization of canonical terms into at least one subcategory, and further comprising a result output operable to display a listing of subcategories associated with a selected category, aggregate changes in interest for the subcategories under the selected category and current interest levels for the subcategories under the selected category.

23. The apparatus of claim 1, further comprising user interface logic operable to receive a selection including at least one canonical term, and at least one category, and the statistics include aggregate interest level and aggregate change in interest level in each of selected canonical terms and categories.

24. The apparatus of claim 23, wherein the user interface logic is further operable to receive, with the selection of the at least one canonical term, a selection of at least one category for limiting statistics relating to the at least one canonical term, the statistics relating to the at least one canonical term including aggregate interest level and aggregate change in interest level in that canonical term for only that selected category.

25. The apparatus of claim 23, wherein the user interface logic is operable to store the selection of the at least one canonical term and the at least one category, and to associate the stored selection of the at least one canonical term and the at least one category with a login identification.

26. A computer-aided method of quantifying aggregate topical interest of web site users, comprising:
  canonicalizing events occurring on at least one server into canonical terms;
  incrementing a count associated with each canonical term for each event canonicalized into that canonical term;
  associating each canonical term with at least one category;
  normalizing counts associated with canonical terms to emphasize time dependent variation in aggregate user interest in those canonical terms; and
  outputting the normalized counts formatted to illustrate the time dependent variation in aggregate user interest.

27. The method of claim 26, further comprising incrementing a count associated with each category for each event canonicalized into canonical terms associated with that category.

28. The method of claim 26, wherein the events occur on servers hosting a portal Web site.

29. The method of claim 26, wherein the servers host a plurality of portal Web sites.

30. The method of claim 26, wherein the events originate from a constrained set of clients.

31. The method of claim 30, wherein the constrained set of clients comprises clients connecting to a network via a selected service provider.

32. The method of claim 30, wherein the constrained set of clients comprises clients entering search events via a predefined portal Web site.

33. The method of claim 26, wherein the events include purchase transactions.

34. The method of claim 26, wherein the events include downloading of media objects.

35. The method of claim 26, wherein the events include searches involving entry of at least one search term.

36. The method of claim 26, further comprising the steps of:
  determining a set of one or more demographic parameters relating to users to which the events are attributable; and
  using the determined set of one or more demographic parameters to distribute the counts associated with canonical terms over a plurality of demographic divisions.

37. The method of claim 26, further comprising a step of allocating advertising space based on the counts associated with canonical terms.

38. The method of claim 26, further comprising the steps of:
  collecting counts associated with canonical terms prior to a campaign;
  executing the campaign;
  collecting counts associated with canonical terms after executing the campaign; and
  comparing the counts associated with canonical terms before and after the campaign as a measure of campaign effectiveness.

39. The method of claim 26, further comprising performing intersection analysis.

40. The method of claim 26, further comprising performing associated interests analysis.

41. The method of claim 26, further comprising a step of generating an advertisement wherein content of the advertisement is a function of the traffic statistics.

42. A computer-aided method of accumulating counts for categories and subjects of search events, comprising;
  receiving a search request from a client;
  canonicalizing the search request into a canonical search term;
  providing a set of search results in response to the search request;
  accepting a selection from the client;
  determining whether the search request should be canonicalized into at least one other canonical search term based on the selection;
  incrementing counts associated with canonical search terms into which the search request was canonicalized;
  associating each of the canonical search terms with at least one category; and
  normalizing the counts associated with canonical search terms to obtain indicia of change in aggregate user interest in the canonical search terms.

43. The computer-aided method of claim 42, further comprising incrementing counts associated with each category for each search request canonicalized into a canonical search term associated with that category.

44. The computer-aided method of claim 42, further comprising normalizing the counts associated with canonical search terms to obtain indicia of current levels of aggregate user interest in the canonical search terms.

45. An apparatus for identifying affinity among search terms, comprising:
  canonicalization logic for canonicalizing searches into canonical terms, the searches inputted by a plurality of users on at least one server;
  categorization logic for aiding in categorization of each canonical term into at least one category;
  term counting logic for incrementing a count associated with each canonical term for each event associated with that canonical term;
  category count logic for incrementing a count associated with each category for each event associated with canonical terms categorized into that category and
  statistical logic operable to correlate aggregate interest of the plurality of users in a selected canonical term with aggregate interest of the plurality of users in other canonical terms, and to identify canonical terms of the other canonical terms with which, based on the statistics, users tend to search while also searching with the selected canonical term.

46. The apparatus of claim 45, wherein the statistical logic is further operable to normalize to account for correlations not attributable to tendency to search with both the at least one other canonical term and the selected canonical term.

47. The apparatus of claim 46, wherein the statistical logic normalizes based on a total number of searches used in forming the statistics.

* * * * *